US012259091B2

(12) United States Patent
Ohba et al.

(10) Patent No.: US 12,259,091 B2
(45) Date of Patent: Mar. 25, 2025

(54) MOUNTING STRUCTURE OF TANK

(71) Applicant: TOYOTA JIDOSHA KABUSHIKI KAISHA, Toyota (JP)

(72) Inventors: Akihiko Ohba, Toyota (JP); Shinnosuke Sako, Toyota (JP); Shusuke Inagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 18/298,477

(22) Filed: Apr. 11, 2023

(65) Prior Publication Data

US 2023/0392755 A1 Dec. 7, 2023

(30) Foreign Application Priority Data

Jun. 1, 2022 (JP) ................................ 2022-089442

(51) Int. Cl.
*F17C 13/08* (2006.01)

(52) U.S. Cl.
CPC .... *F17C 13/084* (2013.01); *F17C 2201/0109* (2013.01); *F17C 2201/035* (2013.01); *F17C 2203/0621* (2013.01); *F17C 2205/0107* (2013.01); *F17C 2205/013* (2013.01); *F17C 2223/035* (2013.01)

(58) Field of Classification Search
CPC ............. A47B 81/007; F17C 2221/012; F17C 2205/013; F17C 2205/0123; F17C 2205/0107; F17C 2205/0103; F17C 2205/01; F17C 2205/00; F17C 2201/035; F17C 2270/0184; F17C 2260/036; F17C 2260/037; F17C 2260/042; F17C 13/123; F17C 13/08; F17C 13/083; F17C 13/084
See application file for complete search history.

(56) References Cited

U.S. PATENT DOCUMENTS

2006/0061081 A1* 3/2006 Kresse .................. B60K 15/07 280/834
2016/0096495 A1* 4/2016 Sasaki .................... F16M 13/02 248/505
2018/0163924 A1* 6/2018 Cook ........................ F17C 1/00
2019/0160941 A1* 5/2019 Fujii ....................... B60K 15/07
2021/0244981 A1 8/2021 Sawada

FOREIGN PATENT DOCUMENTS

JP 2014159817 A 9/2014
JP 2015024665 A 2/2015
JP 2021127784 A 9/2021
JP 2022007482 A 1/2022

* cited by examiner

*Primary Examiner* — Mollie Impink
(74) *Attorney, Agent, or Firm* — Hunton Andrews Kurth LLP

(57) ABSTRACT

The discharge direction when the gas in the high-pressure tank is released by the opening of the plug, the high-pressure tank is arranged so as not to overlap with the position of the plug of the other adjacent high-pressure tank, or one end side of the band for fixing the high-pressure tank to the frame is a first connecting portion fixed to the frame via an elastic body, in the adjacent high-pressure tank, the first connecting portions are arranged so as to face each other, the first connecting portions arranged so as to face each other are arranged so as to be aligned in a direction parallel to the axis of the high-pressure tank.

2 Claims, 5 Drawing Sheets

MOUNTING STRUCTURE OF TANK

CROSS-REFERENCE TO RELATED APPLICATION

This application claims priority to Japanese Patent Application No. 2022-089442 filed on Jun. 1, 2022, incorporated herein by reference in its entirety.

BACKGROUND

1. Technical Field

The present disclosure relates to a mounting structure of a tank.

2. Description of Related Art

Japanese Unexamined Patent Application Publication No. 2015-024665 (JP 2015-024665 A) discloses a mounting structure of a tank in which four high-pressure tanks are arranged adjacent to each other (claims 1, 2, 3).

In Japanese Unexamined Patent Application Publication No. 2014-159817 (JP 2014-159817 A), a plug is described.

Japanese Unexamined Patent Application Publication No. 2022-007482 (JP 2022-007482 A) discloses a structure in which multiple tanks are arranged side by side (FIGS. 1 and 2).

SUMMARY

In the case of arranging a plurality of high-pressure tanks adjacent to each other, it is desired to efficiently mount the high-pressure tanks and save space.

The present disclosure has been made in view of these circumstances, and an object of the present disclosure is to provide a tank mounting structure capable of efficiently mounting a high-pressure tank in a structure in which a plurality of high-pressure tanks is disposed adjacent to each other.

The present application discloses a mounting structure of a high-pressure tank that is a mounting structure of a high-pressure tank in which a plurality of high-pressure tanks provided with a plug is arranged, in which the high-pressure tanks are arranged such that a direction of discharge when gas in the high-pressure tank is discharged by opening the plug does not overlap with a position of the plug of the other adjacent high-pressure tank.

Further, the present application discloses a mounting structure of a high-pressure tank that is a mounting structure of a high-pressure tank in which a plurality of high-pressure tanks is arranged, in which the plurality of high-pressure tanks is fixed to a frame by a belt-shaped band arranged on an outer periphery, in which one end side of the band is a first connecting portion fixed to the frame via an elastic body and another end side is a second connecting portion fixed to the frame without being provided with an elastic body, and in which in the high-pressure tanks adjacent to each other among the plurality of high-pressure tanks, the first connecting portions are arranged so as to face each other, and the first connecting portions that are arranged so as to face each other are arranged so as to be aligned in a direction parallel to axes of the high-pressure tanks.

According to the present disclosure, it is possible to efficiently mount a high-pressure tank in a structure in which a plurality of high-pressure tanks are disposed adjacent to each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Structure of the High-Pressure Tank

Figure 1:
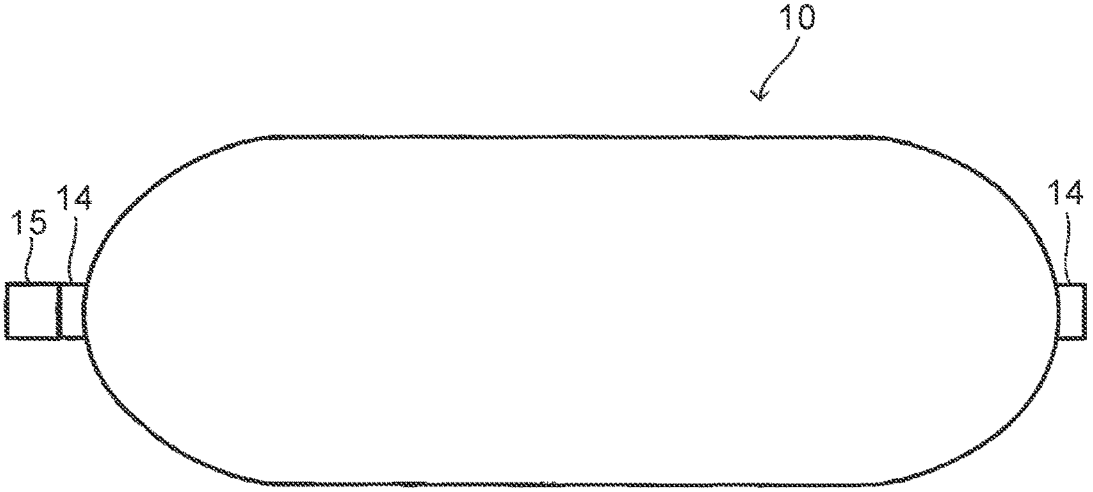
FIG. 1 is a view schematically showing the appearance of a high-pressure tank 10.
Figure 2:
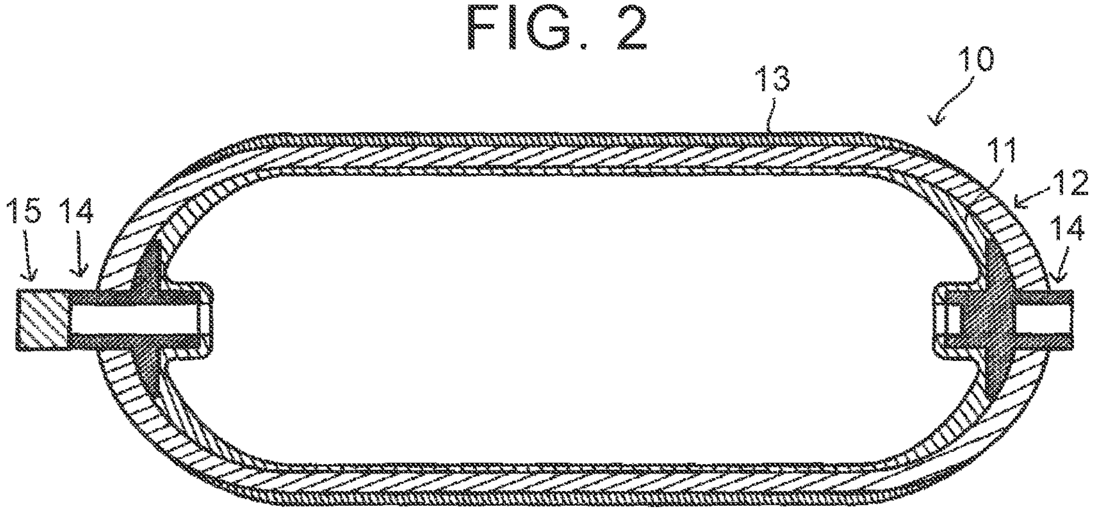
FIG. 2 is a view schematically showing a cross section of the high-pressure tank 10.
Figure 3:
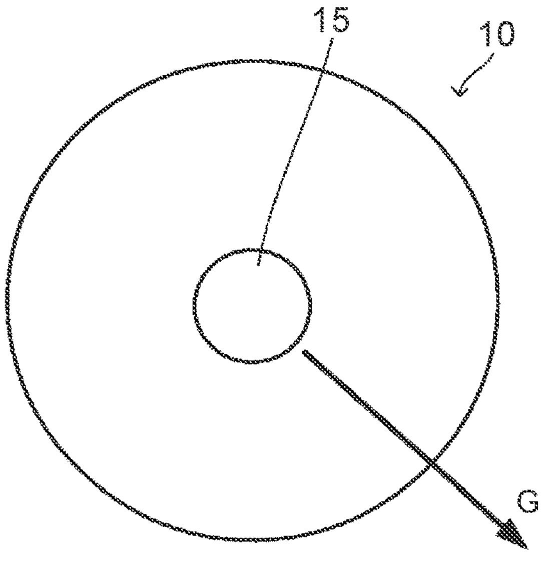
FIG. 3 is an axial view of the high-pressure tank 10.

FIG. 1 schematically shows the appearance of the high-pressure tank 10 according to one embodiment, and FIG. 2 schematically shows a cross section along the axis of the high-pressure tank 10 (the axis of the cylinder of the high-pressure tank 10 that is cylindrical). In addition, FIG. 3 shows a view of the high-pressure tank 10 viewed from the side of the melt plug 15 (the direction in which the axis line extends toward the rear side of the paper surface). As can be seen from these figures, in the present embodiment, the high-pressure tank 10 includes a liner 11, a reinforcing layer 12, a protective layer 13, a base 14, and a plug 15. Each configuration will be described below.

1.1. Liner

The liner 11 is a hollow member that partitions the internal space of the high-pressure tank 10. The liner 11 only needs to be made of a material capable of holding the material contained in the internal space (for example, hydrogen) without leaking, and a known material can be used, and is made of, for example, nylon resin, polyethylene-based synthetic resin, stainless steel, metal such as aluminum, or the like.

The thickness of the liner 11 is not particularly limited, but is preferably 0.5 mm-1.0 mm.

1.2. Reinforcing Layer

The reinforcing layer 12 includes a resin in which fibers are laminated over a plurality of layers and the fibers are impregnated and cured. The fiber-based layer is formed by winding a fiber bundle over a number of layers up to a predetermined thickness on the outer surface of the liner 11.

The thickness of the reinforcing layers 12 is not particularly limited because it is determined by the required strength, but is of the order of 10 mm-30 mm.

Carbon fibers are used for the fiber bundle of the reinforcing layer 12, and the fiber bundle has a band shape having a predetermined cross-sectional shape (for example, a rectangular cross section) as a bundle of carbon fibers. Although not particularly limited, the cross-sectional shapes include a rectangular shape having a width 6 mm-10 mm and a thickness of about 0.1 mm-0.15 mm. The amount of the carbon fiber contained in the fiber bundle is not particularly limited, but may be, for example, about 36000 carbon fibers.

The resin impregnated in the fiber and cured in the reinforcing layer 12 is not particularly limited as long as it can increase the strength of the fiber. Examples thereof include thermosetting resins, which are cured by heat, and examples thereof include an amine-based or anhydride-based curing accelerator, an epoxy resin containing a rubber-based reinforcing agent, and an unsaturated polyester resin. In addition, a resin composition containing an epoxy resin as a main agent and cured by mixing a curing agent therewith can also be mentioned. According to this configuration, the resin composition, which is the mixture, is automatically cured by reaching and penetrating the fiber layer between the mixing of the main agent and the curing agent and the curing agent.

1.3. Protective Layer

The protective layer 13 is a layer disposed on the outer periphery of the reinforcing layer 12 as necessary, and when provided, for example, glass fibers are wound, and the resin is impregnated in the layer. The impregnated resin can be considered similar to the reinforcing layer 12. Thus, impact resistance can be imparted to the high-pressure tank 10. The thickness of the protective layers 13 is not particularly limited, but may be about 1.0 mm~2.0 mm.

1.4. Base

The base 14 is a member attached to each of the two open ends of the liner 11, and one of them functions as an opening for communicating the inside and outside of the high-pressure tank 10, and also functions as an attachment portion for attaching a pipe or a valve to the high-pressure tank 10.

1.5. Plug

The plug 15 is sometimes called a plug-type safety valve, and is a plug in which a flow path (hole) is blocked by a metal having a low melting point. The plug 15 is attached to the base 14, and when a fire or an abnormal high-temperature atmosphere occurs, the metal blocking the flow path is melted by the heat, thereby forming the flow path, and the gas in the high-pressure tank is discharged from the flow path to prevent explosion due to the pressure rise in the high-pressure tank.

Here, in this embodiment, in the high-pressure tank 10, the gas is discharged from the plug 15 so as to face obliquely downward in a posture in which the high-pressure tank 10 is disposed, as indicated by an arrow G in FIG. 3.

A specific type of the plug to be applied to the plug 15 is not particularly limited, and a known type can be applied.

2. High-Pressure Tank Holding Device

Figure 4:
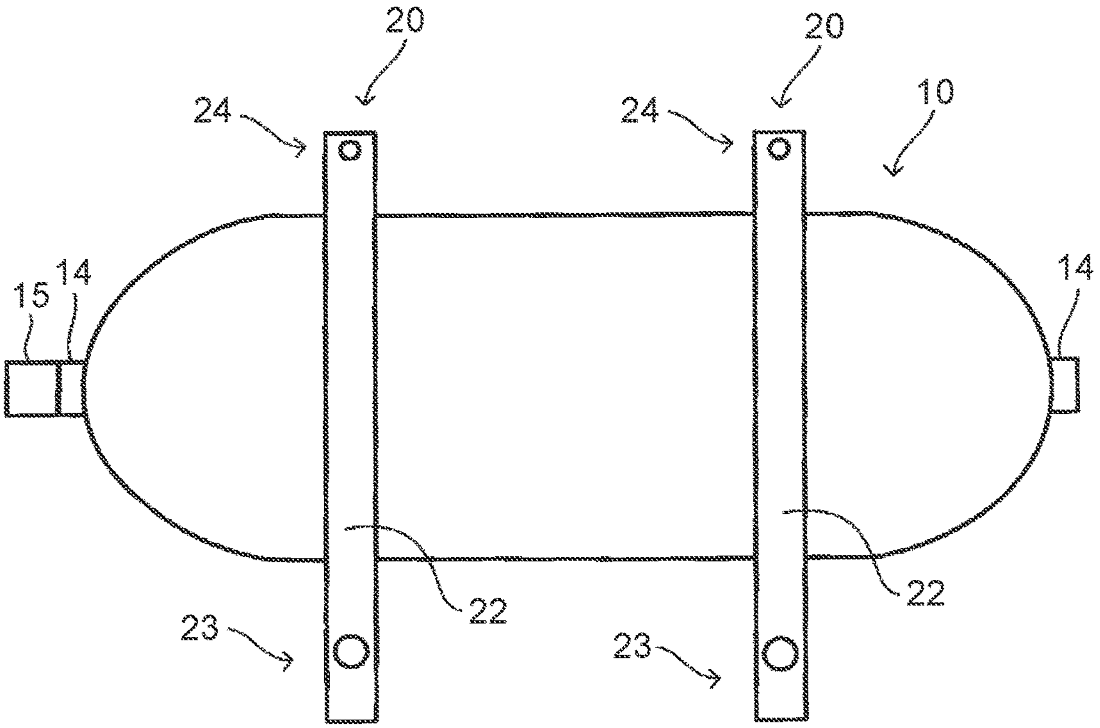
FIG. 4 is a view for explaining the high-pressure tank holding device 20.
Figure 5:
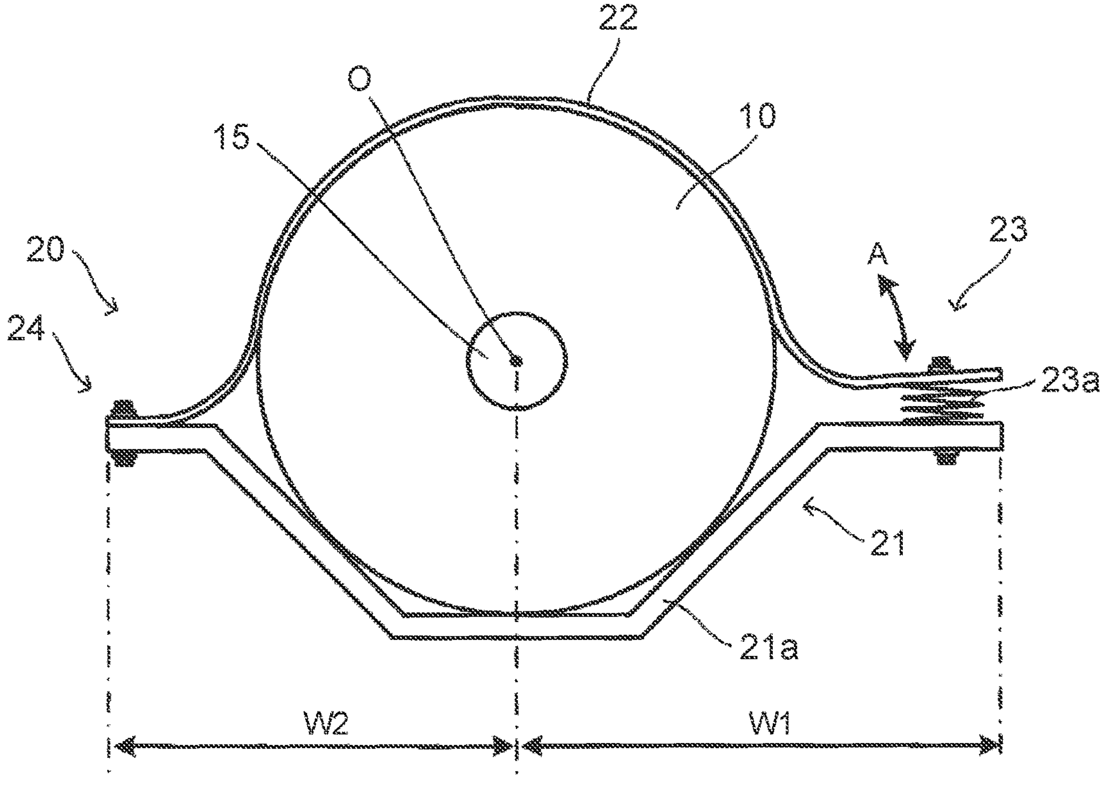
FIG. 5 is a view for explaining the high-pressure tank holding device 20.

FIG. 4 and FIG. 5 show the tank holding device 20, which is a device for holding the high-pressure tank 10 in place. FIG. 4 is a view similar to FIG. 1, and FIG. 5 is a view similar to FIG. 3. The tank holding device 20 of the present embodiment includes a frame 21 and a band 22, and the frame 21 and the band 22 are arranged so as to surround the outer periphery of the high-pressure tank 10 by sandwiching the high-pressure tank 10 between the outer peripheral portions and being connected (connecting portion) to the frame 21 at the end portion of the band 22. As can be seen from FIG. 4, in the present embodiment, two tank holding devices 20 are used, and the tank holding devices 20 are arranged at two positions aligned in the axial direction of the high-pressure tank 10.

2.1. Frame

The frame 21 is a member formed by bending a plate-shaped metal, and is arranged along the outer periphery of the high-pressure tank 10 so as to sandwich the high-pressure tank 10 between the frame 21 and the band 22 in a posture in which the high-pressure tank 10 is held by the tank holding device 20. More specifically, the frame 21 is provided with a recessed portion 21*a* on a side where the high-pressure tank 10 is disposed, and is arranged so that an outer peripheral portion of the outer periphery of the high-pressure tank 10, which is a lower half side of the axial line, enters the inside of the recessed portion 21*a*.

The material for forming the frame is not particularly limited, but is preferably a material advantageous for strength and elastic deformation. From this viewpoint, the metal is preferable, and for example, stainless steel can be exemplified. Thickness is not limited, but may be as 2 mm~10 mm for stainless-steel.

2.2. Band

The band 22 is a belt-like member, and is arranged along the outer periphery of the high-pressure tank 10 so as to sandwich the high-pressure tank 10 between the frame 21 and the band 22 in a posture in which the high-pressure tank 10 is held by the tank holding device 20. More specifically, the band 22 is arranged such that a surface on one side formed by the length direction and the width direction thereof is opposed to an outer peripheral portion of the outer periphery of the high-pressure tank 10, which is in particular the upper half side of the axial line, and the thickness direction is the radial direction of the high-pressure tank 10.

The material for forming the band is not particularly limited, but is preferably a material advantageous for strength and elastic deformation. From this viewpoint, the metal is preferable, and for example, stainless steel can be exemplified. The thickness is not limited, but may be of the order of 0.5 mm to 2 mm for stainless-steel.

2.3. Connecting Portion

As described above, the frame 21 and the band 22 are connected by connecting portions at both ends of the band 22. One end side of the band 22 is the first connecting portion 23, and the other end side of the band 22 is the second connecting portion 24.

As can be seen from FIG. 5, the end portion of the band 22 of the first connecting portion 23 is attached to the frame 21 via an elastic 23*a* (for example, a spring). This allows the end of the band 22 to move with a biasing force as indicated by arrow A in FIG. 5. The biasing force is configured to act in a direction in which the high-pressure tank 10 is pressed toward the frame 21 side, and the high-pressure tank 10 can be stably held even when the diameter is reduced due to the difference in size of the high-pressure tank 10 or the use of the high-pressure tank 10.

As can be seen from FIG. 5, the second connecting portion 24 is attached to the frame 21 directly by a combination of a bolt and a nut without using an elastic body at the end of the band 22.

As described above, the present embodiment includes two connecting portions that differ from each other, and since the elastic 23*a* is disposed in the first connecting portion 23, the connecting portion is larger than the second connecting portion 24. Specifically, as shown by W1 and W2 in FIG. 5, the distance W1 from the axis O of the high-pressure tank 10 to the end of the first connecting portion 23 in the radial direction of the high-pressure tank 10 is larger than the distance W2 from the axis O of the high-pressure tank 10 to the end of the second connecting portion 24.

3. Tank Mounting Structure

The high-pressure tank 10 described above is mounted on a vehicle, for example, as a tank for storing hydrogen, which is fuel for a fuel cell electric vehicle, but a plurality of high-pressure tanks are usually mounted. Therefore, a structure (tank mounting structure) when a plurality of high-pressure tanks are mounted on a vehicle or the like will be described below.

3.1. Tank Mounting Structure (1)

Figure 6:
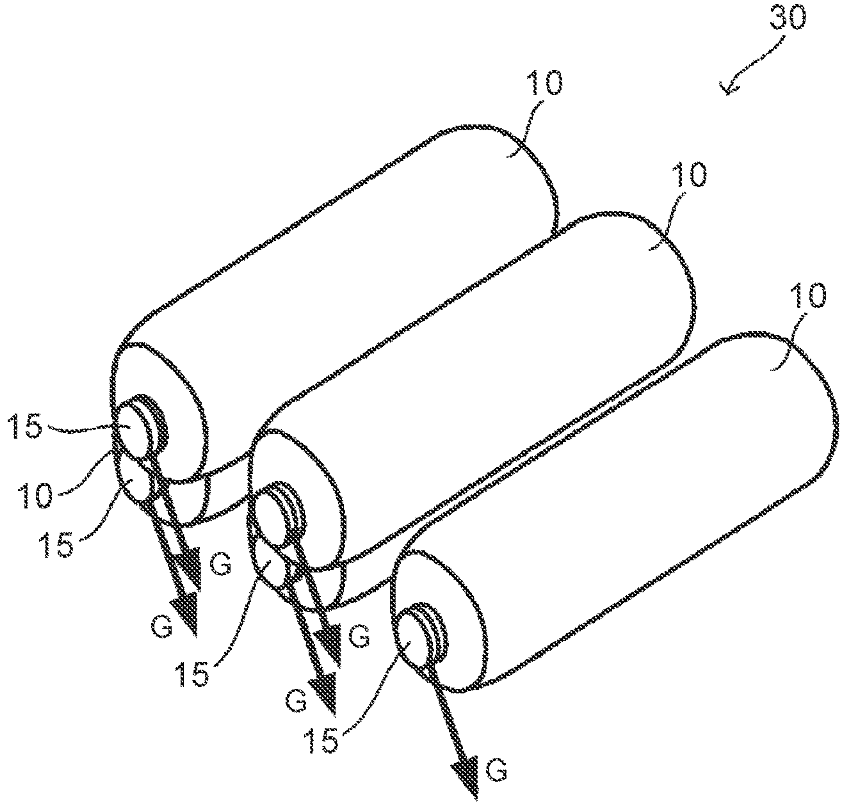
FIG. 6 is a perspective view of the mounting structure 30 of the tank.
Figure 7:
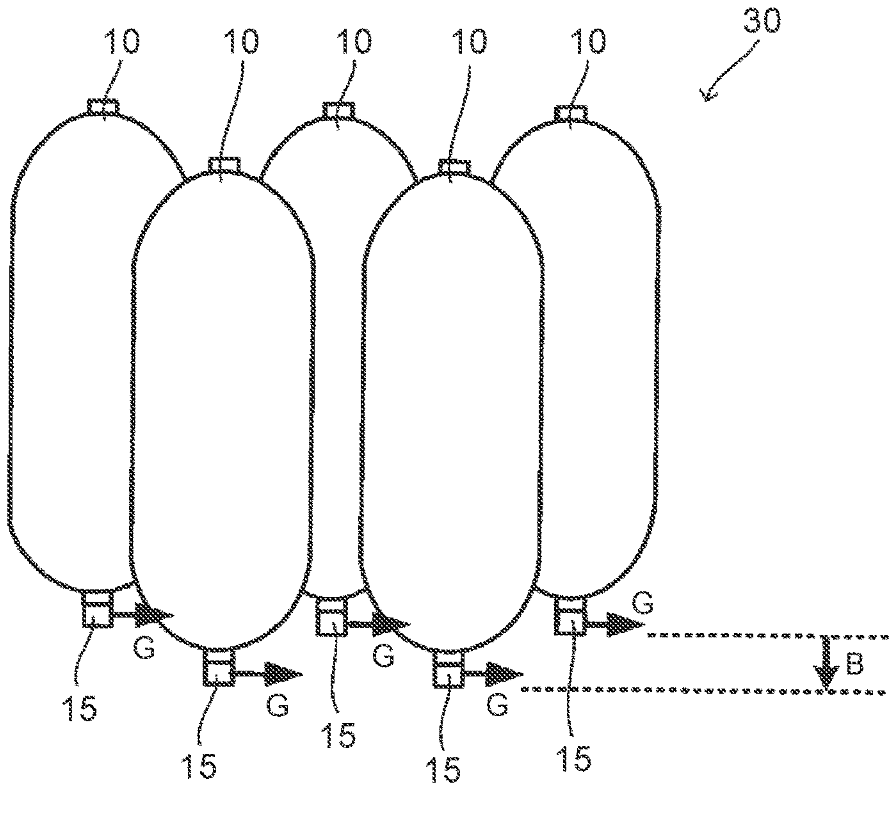
FIG. 7 is a plan view of the mounting structure 30 of the tank.

FIG. 6 and FIG. 7 schematically show a tank mounting structure 30 according to one embodiment. FIG. 6 is a perspective view of the tank mounting structure 30, and FIG. 7 is a plan view of the tank mounting structure 30. In the tank mounting structure 30, each of the plurality of high-pressure tanks 10 is fixed by the above-described tank holding device 20, but the display is omitted in FIGS. 6 and 7.

In the tank mounting structure 30, a plurality of high-pressure tanks 10 are arranged, and in the present embodiment, three high-pressure tanks 10 are arranged in the lower stage and two high-pressure tanks 10 are arranged in the upper stage. When the high-pressure tank 10 is arranged, it is preferable to arrange a plurality of high-pressure tanks 10 in as little space as possible, so that a large number of spaces of other parts can be taken up. The same applies to the tank mounting structure 40 described later.
Therefore, the plurality of high-pressure tanks 10 are placed such that the outer peripheral surfaces thereof face each other so as to be as dense as possible, and the base 14 and the melt plug 15 are arranged in the same direction. However, when the gas is discharged from the high-pressure tank 10 from the plug 15 for some reason, the gas is discharged obliquely downward as described above from the respective plug 15, so that the gas discharged from the upper stage (in some cases, the gas is ignited to the flame) hits the plug 15 of the high-pressure tank 10 of the lower stage, there is a possibility that damage is caused.

On the other hand, in the tank mounting structure 30, as shown by B in FIG. 7, the position of the plug 15 of the high-pressure tank 10 arranged in the upper stage in plan view is arranged so as to be shifted in the axial direction with respect to the position of the plug 15 of the high-pressure tank 10 arranged in the lower stage. That is, in the tank mounting structure 30, the high-pressure tank 10 is arranged such that the discharge direction when the gas is discharged from the high-pressure tank 10 by opening the plug 15 does not overlap the position of the plug 15 of the other adjacent high-pressure tank 10 including the lower stage. As a result, in the plurality of high-pressure tanks 10, the exhaust gas G (and the flame associated therewith) from the plug 15 hardly affects the other high-pressure tanks 10. Further, in such a configuration, since it is not necessary to widen the space in the arrangement direction of the high-pressure tank 10 (the left-right direction of the paper in FIG. 7), it is possible to reduce the influence of the gas discharged from the plug 15 on the other high-pressure tank 10 while suppressing the expansion of the space.

3.2. Tank Mounting Structure (2)

Figure 8:
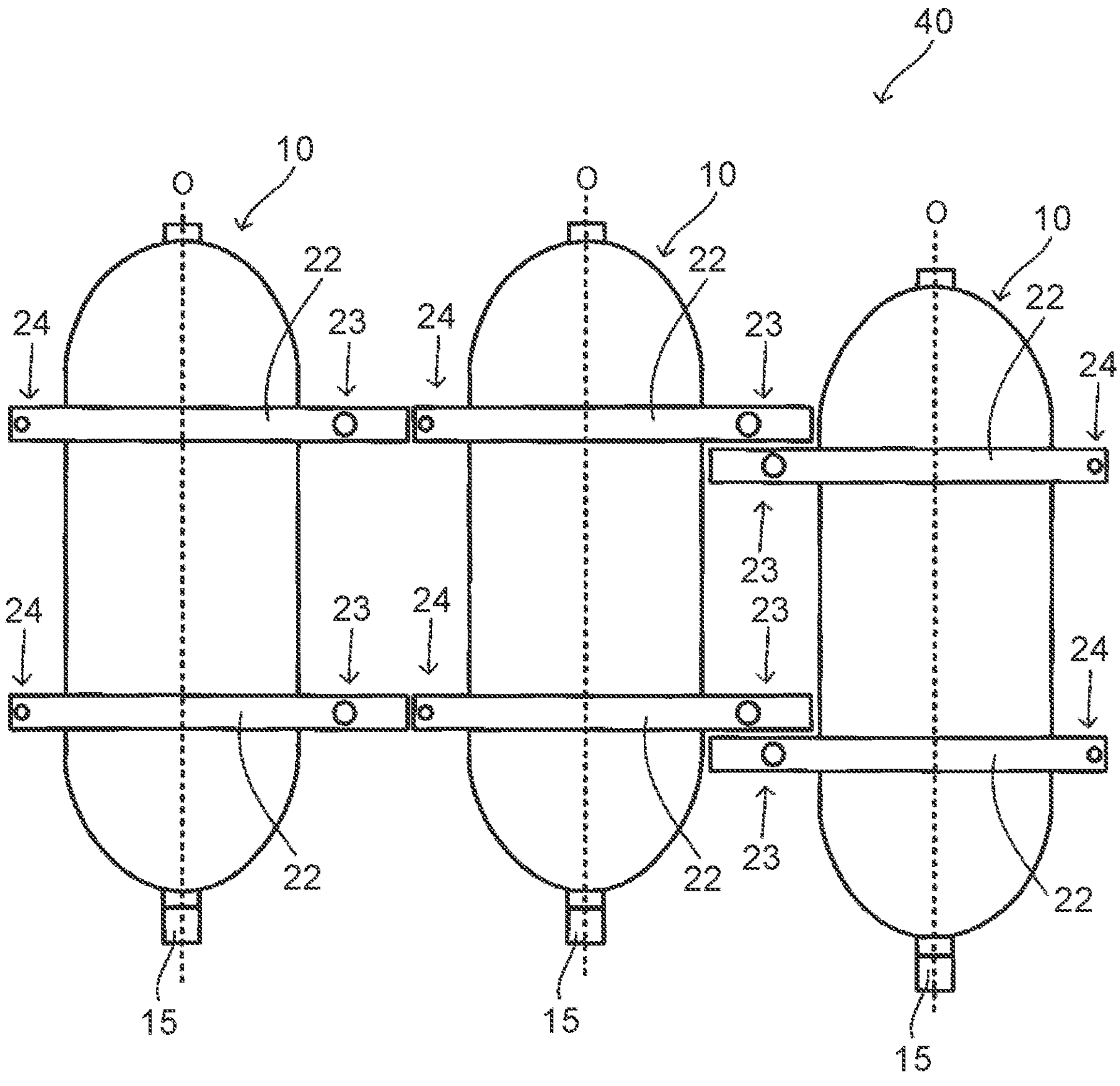
FIG. 8 is a plan view of the mounting structure 40 of the tank.
Figure 9:
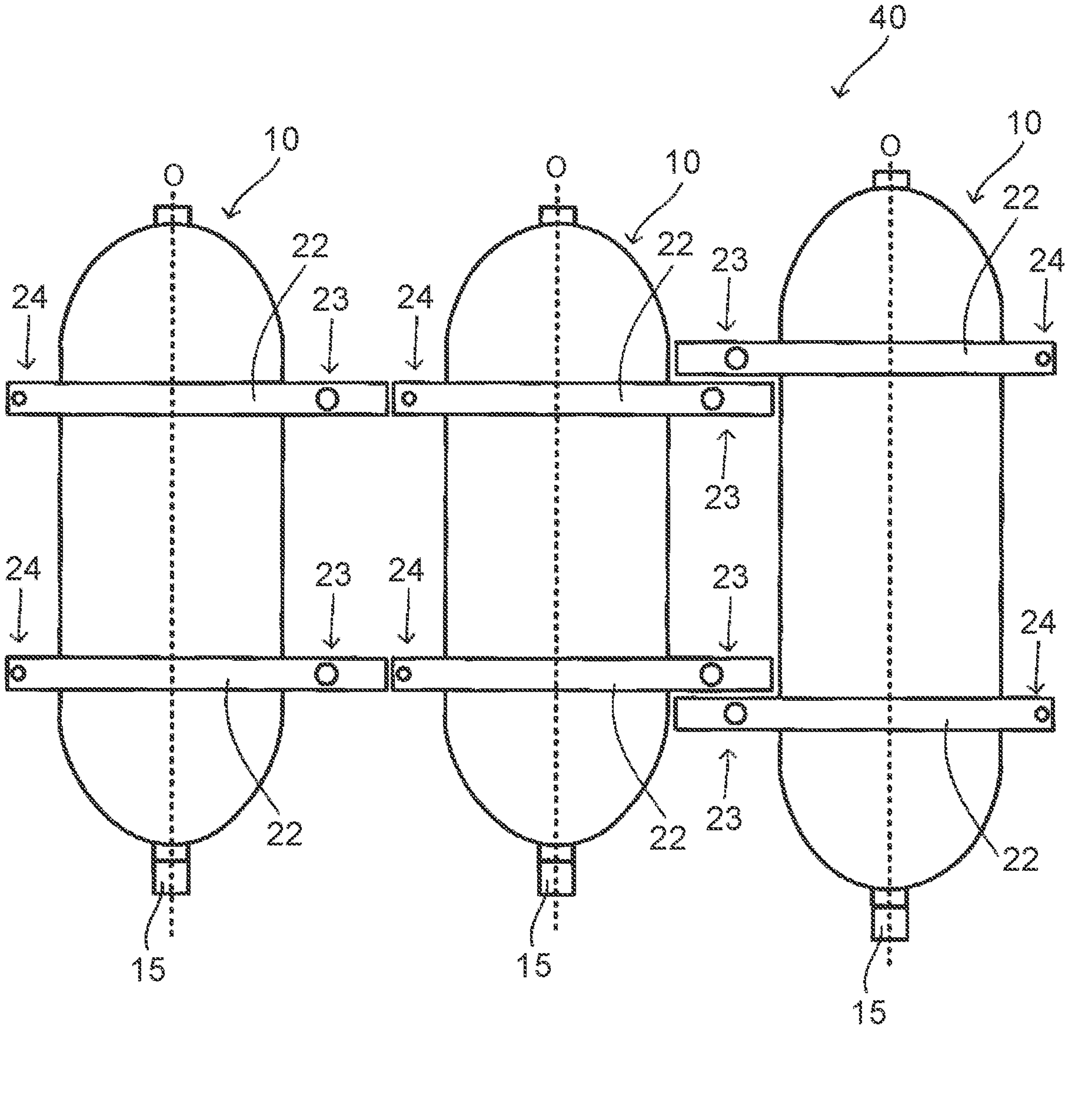
FIG. 9 is a plan view of the mounting structure 40 of the tank.

FIG. 8 and FIG. 9 schematically show a tank mounting structure 40 according to another embodiment. FIG. 8 and FIG. 9 are plan views. Here, the three high-pressure tanks 10 arranged in the horizontal direction so that the outer peripheral surfaces face each other will be described as an example, but the present disclosure is not limited thereto, and two or four or more high-pressure tanks 10 may be arranged, or the high-pressure tanks 10 may be arranged in stages in the vertical direction.

In the present embodiment, as can be seen from FIGS. 7 and 9, at least a part of the adjacent high-pressure tanks 10, the first connecting portions 23 are arranged so as to face each other, and the first connecting portions 23 arranged so as to face each other are arranged so as to be aligned in a direction parallel to the axis O of the high-pressure tank 10. FIG. 7 shows an example in which the lengths of the adjacent high-pressure tanks 10 (the size in the direction in which the axis O extends) are the same, and FIG. 8 shows an example in which the lengths of the adjacent high-pressure tanks 10 are different.

According to this configuration, it is possible to reduce the space required in the arrangement direction of the high-pressure tank 10 as compared with the case where the high-pressure tanks 10 are simply arranged. In particular, by adopting such a configuration between the first connecting portions 23 (W1 in FIG. 5) larger than the second connecting portions 24 instead of the second connecting portions 24, it is possible to further save space.

3.3. Other

Although the tank mounting structure 30 and the tank mounting structure 40 are individually described above, either one of them may be applied, or both of them may be applied simultaneously.

What is claimed is:

1. A mounting structure of a high-pressure tank, the mounting structure comprising;
- a first high-pressure tank; and
- a second high-pressure tank,
- wherein the first high-pressure tank is fixed to a frame by a first band arranged on an outer periphery of the first high-pressure tank,
- wherein the second high-pressure tank is fixed to the frame by a second band arranged on an outer periphery of the second high-pressure tank,
- wherein a first end of the first band is fixed to the frame via a first elastic body and a second end of the first band is fixed to the frame without being provided with an elastic body,
- wherein a first end of the second band is fixed to the frame via a second elastic body and a second end of the second band is fixed to the frame without being provided with an elastic body, wherein the first end of the first band and the first end of the second band are arranged so as to face each other in a direction parallel to a central axis of the first high-pressure tank and a central axis of the second high-pressure tank, wherein a first distance from the central axis of the first high-pressure tank to an edge of the first end of the first band in a radial direction of the first high-pressure tank is larger than a second distance from the central axis of the first high-pressure tank to an edge of the second end of the first band, and, wherein a third distance from the central axis of the second high-pressure tank to an edge of the first end of the second band in a radial direction of the second high-pressure tank is larger than a fourth distance from the central axis of the second high-pressure tank to an edge of the second end of the second band.

2. The mounting structure of a high-pressure tank according to claim 1, wherein the first end of the first band is adjacent to the first end of the second band.

* * * * *